July 3, 1962 A. SHERMAN 3,042,299
SENSING DEVICE FOR DATA CARDS AND THE LIKE
Filed June 23, 1958 7 Sheets-Sheet 1

INVENTOR
Alex Sherman
BY
Attorney

July 3, 1962 A. SHERMAN 3,042,299
SENSING DEVICE FOR DATA CARDS AND THE LIKE
Filed June 23, 1958 7 Sheets-Sheet 4

INVENTOR
Alex Sherman
BY
Attorney

July 3, 1962 A. SHERMAN 3,042,299
SENSING DEVICE FOR DATA CARDS AND THE LIKE
Filed June 23, 1958 7 Sheets-Sheet 7

INVENTOR
Alex Sherman
BY
Attorney

United States Patent Office 3,042,299
Patented July 3, 1962

3,042,299
SENSING DEVICE FOR DATA CARDS AND THE LIKE
Alex Sherman, Anaheim, Calif., assignor, by mesne assignments, to Square D Company, Detroit, Mich., a corporation of Michigan
Filed June 23, 1958, Ser. No. 743,935
14 Claims. (Cl. 235—61.11)

The present invention relates to a device for sensing the arrangement of perforations in a data card which is perforated in accordance with a prearranged code and the principal object of the invention is to provide new and improved devices of such character.

In wide use in business and industry today are so called "electronic brains" and other automatic equipment. Prior to performing its functions, apparatus of this type requires that certain information be fed thereto and in most apparatus, the information is fed by means of a data card which contains a plurality of perforations arranged in a predetermined code. The present device is adapted to read, or sense, the arrangement of the perforations in the data card and to transmit such information to other equipment which then operates and/or causes still other equipment to operate in a predetermined manner in accordance therewith.

The present device is completely fool-proof in operation and requires only that a data card be inserted in a slot. The device will then determine whether the card is properly positioned for reading and if not, it will immediately reject the card. If the card is properly positioned, it will read the card, pass the information on to the equipment which requires the information, and thereafter eject the card when it is no longer needed. The device is highly is highly efficient for its intended purpose and will operate accurately for long periods of time with little or no maintenance. These and other advantages will readily become apparent from a study of the following description and from the drawings appended hereto.

In the drawings accompanying this specification and forming a part of this application there is shown, for purposes of illustration, embodiments which the invention may assume, and in these drawings.

Figures 1, 2, 5:
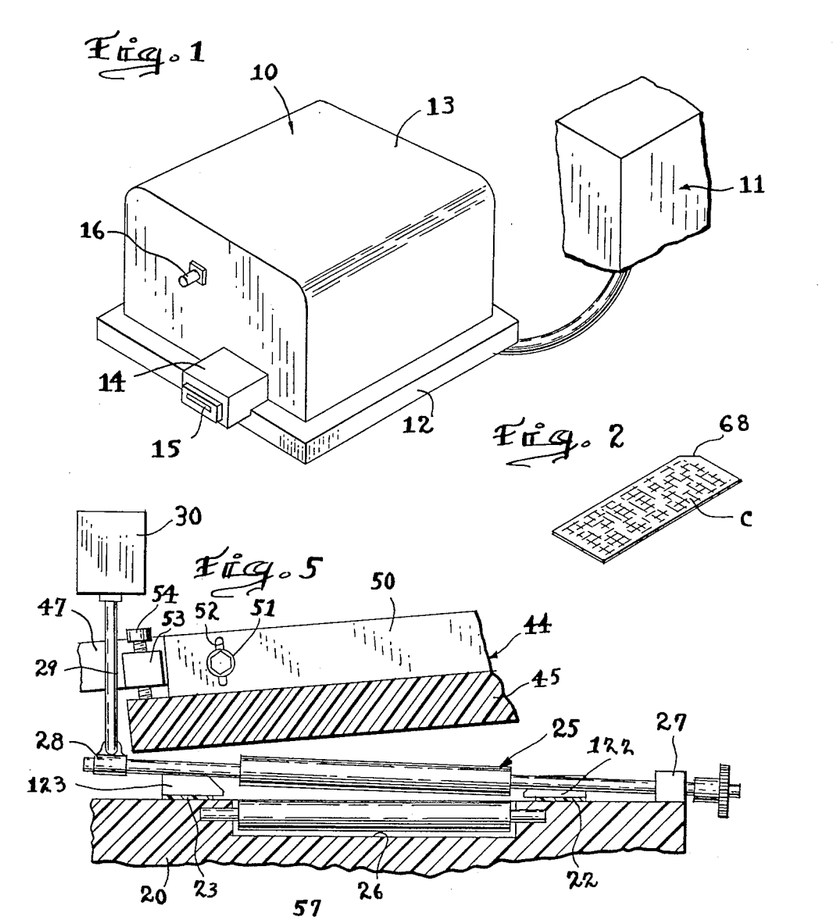
FIGURE 1 is a perspective view of a device embodying the present invention.
FIGURE 2 is a perspective view of a data card of the type which is adapted to be read by the present device.
FIGURE 5 is a fragmentary, further enlarged sectional view generally corresponding to the line 5—5 of FIGURE 4.

Referring to FIGURE 1, the present invention is concerned with apparatus 10 which reads, or senses, the arrangement of perforations in a data card which is perforated in accordance with a prearranged code and which is electrically connected with apparatus 11 which utilizes, in various ways, the information imparted by the perforated card. Since apparatus 11 forms no part of the present invention and is disclosed merely incidentally to facilitate a more complete understanding of apparatus 10 with which it is associated, it is believed that a more detailed description of apparatus 11 is unnecessary.

Briefly, apparatus 10 is herein disclosed as comprising a base 12 to which various components, as will hereinafter be disclosed, are secured. Overlying and protecting such components is cover means 13 and projecting outwardly of the cover means 13 is a structure 14 providing a slot 15 through whose mouth the card to be sensed (see FIGURE 2) is adapted to be inserted. Also projecting outwardly of the cover is a push button 16 for a purpose later to be disclosed.

Figure 3:
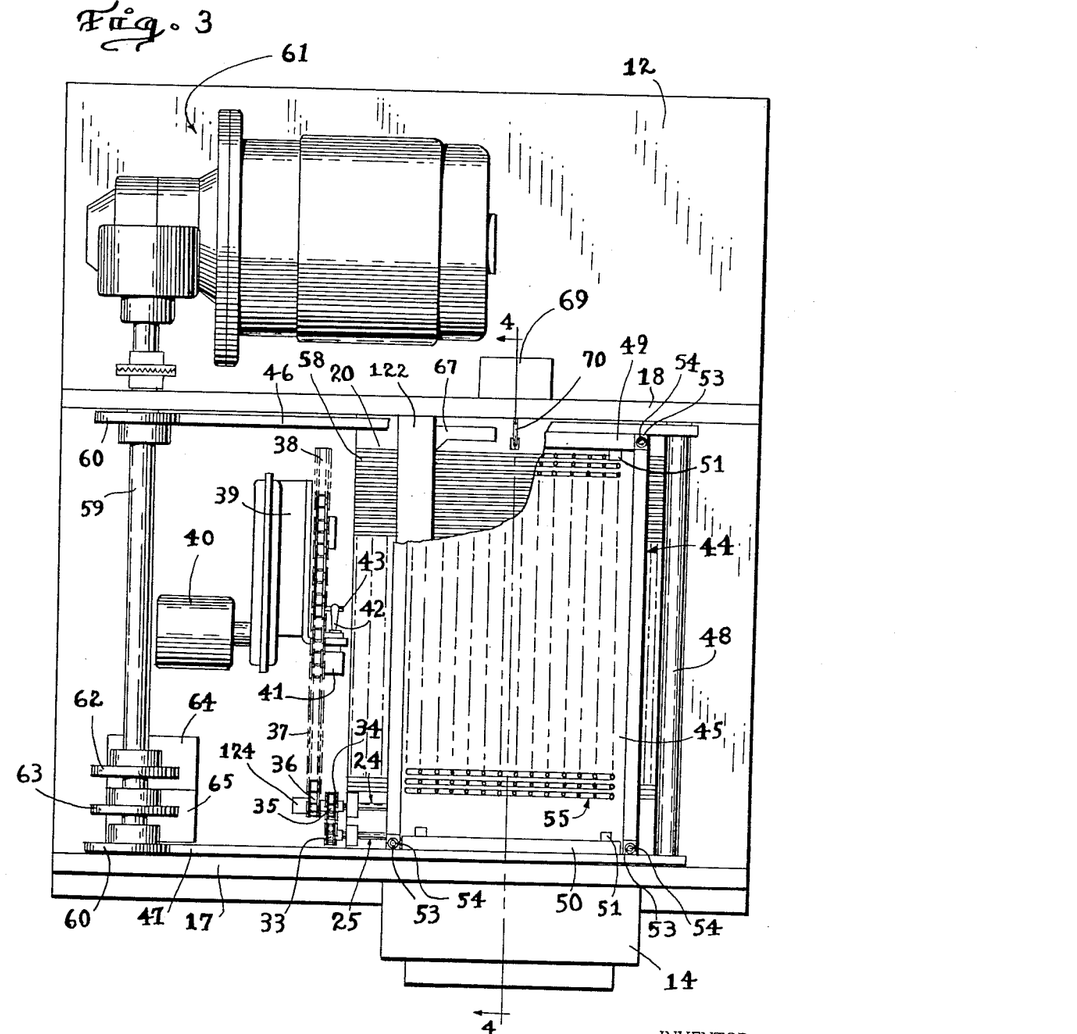
FIGURE 3 is an enlarged plan view of the device with cover removed to show the underlying structure.
Figures 4, 14:
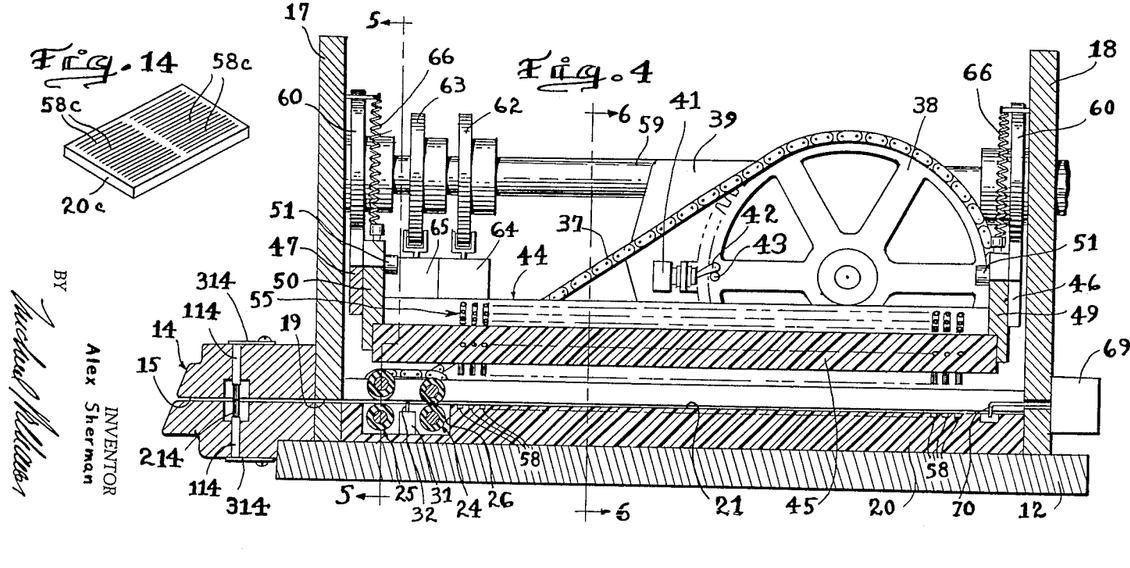
FIGURE 4 is a sectional view generally corresponding to the line 4—4 of FIGURE 3.
FIGURES 12, 13 and 14 are views similar to FIGURE 10 but of modified constructions.

With reference to FIGURES 3 and 4 but more particularly to the latter, a pair of spaced-apart, upstanding walls 17, 18 are secured to base 12. Wall 17 is slotted at 19 to pass the card and secured to base 12 between the walls and in alignment with slot 15 is a dielectric plate 20 whose upper surface 21 lies in a plane with the bottom margin of slot 15. As will later be disclosed, the card is adapted to be introduced in the mouth of slot 15 and moved along surface 21 of plate 20 to a predetermined sensing position.

Means are provided for wiping dust and the like from the upper and lower data card surfaces and as seen in FIGURE 4, structure 14 provides upper and lower brushes 114, 214 which are resiliently biased toward respective card surfaces by means of suitable leaf springs 314. It will be apparent that as the data card is passed between the spring-loaded brushes, any dust or the like, which might have an adverse effect upon certain internal working parts of the device, will be removed.

Figure 6:
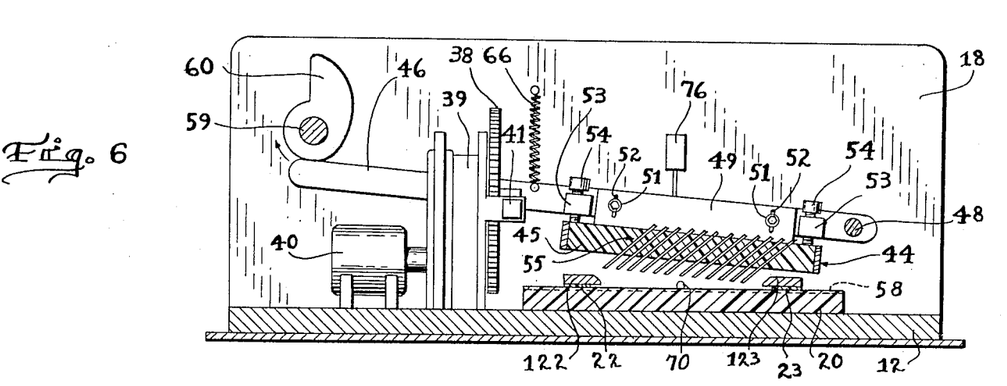
FIGURE 6 is a sectional view generally corresponding to the line 6—6 of FIGURE 4.

Means are provided for guiding the card along plate 20 after it leaves slot 15 and as best seen in FIGURE 6, a pair of spaced-apart dielectric guide strips 22, 23 are secured to plate 20 to closely receive the card therebetween. Overlying respective strips 22, 23 are strips 122, 123 whose adjoining margins extend beyond respective adjoining margins of strips 22, 23 to overhang the card and insure that it will lie flat against surface 21 of plate 20.

Means are provided for moving the card along plate 20 and in the present embodiment as best seen in FIGURE 4, two sets of rubber covered pinch rolls 24, 25 are located adjacent slot 15. These roll sets are spaced-apart longitudinally of the direction of card movement and plate 20 is recessed at 26 to provide clearance for the lower rolls of such sets. Although not shown, the upper and lower rolls of roll set 24 are mounted for rotation by any suitable means.

Figure 8:
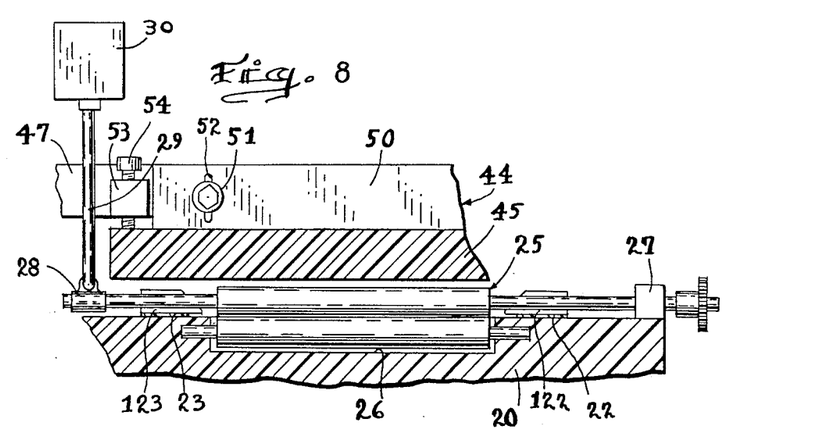
FIGURE 8 is a view similar to FIGURE 5 but showing certain parts in another position.

Roll set 25 differs from roll set 24 in that its upper roll is bodily shiftable toward and away from engagement with a card positioned therebetween. As viewed in FIGURE 5, one end of the shaft of the upper roll of roll set 25 is rotatably carried by a suitable bearing 27 which provides for limited pivotal movement of the shaft while the other end of such shaft is rotatably carried by a bearing 28 which is pivotally secured to the plunger 29 of a solenoid 30. A suitable spring or the like (not shown) normally holds the upper shaft of this roll set in the position shown in FIGURE 5 wherein the roll set will freely pass a card positioned therebetween; however, when solenoid 30 is energized, the upper roll will be shifted thereby to the position seen in FIGURE 8 so as to grip a card between the respective rolls of this set. Presently interposed between roll sets 24, 25 in recess 26 (see FIGURE 4) and for a purpose to be seen is a suitable switch 31 having an actuator 32 which is adapted to be tripped by the leading edge of the card as it is pushed through slot 15. This switch location, however, is illustrative only and it will be understood that it may be otherwise located for engagement with the card.

Rotation of roll sets 24, 25 is effectuated in the following manner: As best seen in FIGURES 3 and 4, the upper roll shaft of set 25 carries a sprocket 33 and the upper roll shaft of set 24 carries a sprocket 34. A suitable chain 35 connects the sprockets to effect simultaneous rotation of respective upper rolls. The upper roll shaft of roll set 24 also carries a sprocket 36 which is connected by means of a chain 37 to an output sprocket 38 of a reducer 39 which is driven by means of a suitable motor 40. From the foregoing, it will be seen that rotation of motor 40 will effect simultaneous rotation in the same direction of respective upper rolls of roll sets 24, 25 while the lower rolls of such sets merely function as idler rolls. For a purpose to be seen, a suitable overload clutch 124 is carried by the upper roll shaft of roll set 24 to limit the amount of torque which will be transmitted to such roll set from motor 40, through reducer 39, output sprocket 38 and chain 37.

Still referring to FIGURES 3 and 4 and for a purpose to be later disclosed, a switch 41 is suitably mounted on the housing of reducer 39 and has an actuator 42 which is positioned for engagement with a pin 43 carried by sprocket 38. As will be evident, see especially FIGURE 4, rotation of sprocket 38 in one direction will cause pin 43 to shift actuator 42 in one direction while rotation of the sprocket in the opposite direction will cause the pin to shift the actuator in the opposite direction.

As best seen in FIGURE 6 but as also shown in FIGURES 3 and 4, a head 44 is position above plate 20. This head presently comprises a dielectric plate 45 which is secured between spaced arms 46, 47 (see especially FIGURE 4) whose one ends are secured to a rock shaft 48 journalled in respective walls 17, 18. Any suitable means may be employed to so secure plate 45 to the arms that its angularity may be adjusted relative thereto. At the present time, plate 45 carries spaced-apart, upstanding flanges 49, 50 adjacent respective arms 46, 47 and suitable capscrews 51 pass through respective elongated apertures 52 therein and are threaded into respective arms to secure respective flanges thereto. Each arm carries a pair of spaced ears 53 in which is threaded a capscrew 54 whose end bears against head 44. To adjust plate 45, capscrews 51 will be slightly loosened and capscrews 54 adjusted to tilt the plate as required. When the plate is properly positioned, capscrews 51 will then be tightened to secure it in its adjusted position.

Carried by plate 45 are a plurality of brush assemblies 55 corresponding in number and position to the apertures in the data card. For example, one type data card is arranged to provide 80 aperture rows with up to 12 apertures in each row. Of course, no card normally has the maximum complement of 960 apertures formed therein; however, any combination of apertures may be present in any one card depending upon the manner and type of information coded thereon. Since any card may, in the present example, be apertured at any one or more of 960 places, plate 45 carries a brush assembly adjacent each of the places where the card may be apertured.

Figure 7:
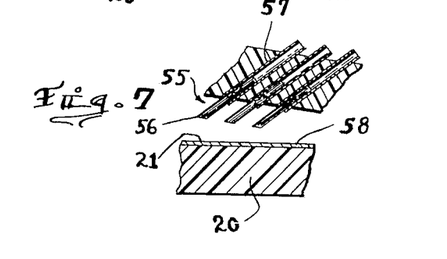
FIGURE 7 is a fragmentary view, similar to FIGURE 6, but considerably enlarged to show certain details.

As illustrated in FIGURE 7, each brush assembly 55 comprises a plurality of metallic bristles 56, presently formed of beryllium copper for long life, crimped into one end of a metallic tube 57. In the embodiment shown in FIGURES 3, 4, 6, 7 and 9, each brush assembly is pressed into an aperture in plate 45 with the end of tube 57 projecting upwardly of the plate to provide for making an electrical connection (not shown) thereto and with the bristles projecting downwardly therefrom. Each brush assembly is mounted at an acute angle with the plate as shown for a purpose later to be disclosed.

Figure 10:
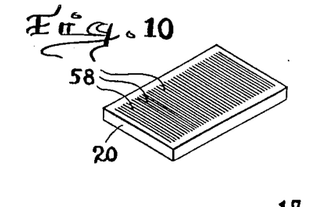
FIGURE 10 is a reduced size perspective view of a detail.

Plate 20 carries contact means which cooperate with the brush assemblies 55 to provide electrical sensing circuits and as best seen in FIGURES 4 and 10, such contact means may comprise a plurality of electrically conductive strips 58 extending transversely of the plate and embedded in and flush with the upper surface 21 thereof. In the embodiment of the invention thus far disclosed, strips 58 are arranged in 80 rows to correspond to the 80 rows of brush assemblies. Although not shown, each strip 58 and also the brush assemblies are adapted to be connected in electrical sensing circuits which are completed when respective brush assemblies engage respective strips.

The means presently provided for swinging arms 46, 47 about their rock shaft 48 comprises a rotatably mounted shaft 59 which carries cams 60 engageable with respective arms 46, 47 (see FIGURES 3, 4 and 6). Shaft 59 is adapted to be rotated by means of a motor-reducer unit 61 (FIGURE 3). For a purpose to be disclosed, shaft 59 also carries cams 62, 63 which are engaged with the actuators of respective limit switches 64, 65. Cams 60 are normally positioned as shown in FIGURE 6 to permit springs 66 (see also FIGURE 4) to elevate arms 46, 47 and thus hold head 44 up so that the brush assemblies carried thereby are raised above surface 21 of plate 20. When, however, cams 60 are rotated to the position shown in FIGURE 9, the arms will be moved downwardly to move the brush assemblies toward engagement with contact strips 58. It is to be understood that while it is preferable at the present time to shift head 44 about a pivot and by means of motor 61 and cams 60, other well-known expedients may be employed to shift the head, through a desired path of travel, toward and away from the card.

Referring to FIGURE 3, an abutment 67 is secured to and projects upwardly of surface 21 of plate 20 for engagement with the cut corner 68 (see FIGURE 2) of the data card for a purpose to be seen and carried by wall 18, also for a purpose to be disclosed, is a limit switch 69 (see also FIGURE 4) having an actuator 70 which projects through an aperture in the wall and is positioned for engagement with the leading edge of the card when the latter is disposed in sensing position.

Figure 11:
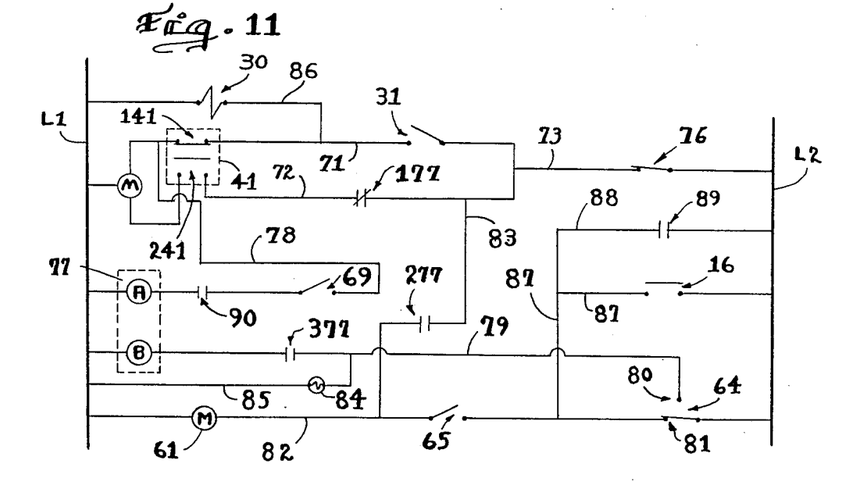
FIGURE 11 is a schematic diagram illustrating the electrical components and circuits employed in controlling operation of the device.

In order to provide for the desired operation of the construction thus far described, various electrical components are arranged in electrical circuits schematically shown in FIGURE 11. As seen in FIGURE 11, motor 40 (which drives roller sets 24, 25) is connected across power lines L1, L2 by means of parallel circuits 71, 72, one of which effects rotation of motor 40 in one direction and the other of which effects its rotation in the opposite direction, and a common circuit 73. Interposed in circuits 71, 72 are respective contacts 141, 241 of a toggle switch 41 and in the position of parts shown, contacts 141 are closed while contacts 241 are open. Interposed in circuit 71 are the normally open contacts of limit switch 31 and interposed in circuit 73 are the normally open contacts of a limit switch 76 (see FIGURE 6) whose actuator is engaged with arm 46 while the latter is in the elevated position shown to thus maintain the contacts of this switch closed.

Connected across lines L1 and L2 are the actuating coils A and B of a latching relay 77 of the type having a plurality of contacts which are shifted from one position to another upon momentary energization of coil A and are returned to said one position upon momentary energization of coil B. Relay 77 has normally closed contacts 177 interposed in circuit 72 and normally open contacts 277, 377 whose location will later be described. Coil A of relay 77 is in a circuit 78 which extends from L1 to circuit 71 at a place intermediate contacts 141 and motor 40, and thence to L2 via circuit 73. Coil B is interposed in a circuit 79 which extends from L1 to L2 through the normally open contacts 80 of cam actuated limit switch 64. The normally closed contacts 81 of this limit switch are interposed in a circuit 82 which connects motor-reducer 61 across lines L1, L2.

Interposed in circuit 82 intermediate limit switch 64 and motor 61 are the normally closed contacts of the cam operated limit switch 65 which are here shown being held open by virtue of the position of its actuating cam 63. Extending across circuits 72, 82 is a circuit 83 in which are interposed the aforementioned normally open contacts 277 of latching relay 77 and interposed in the aforesaid circuit 79 are the normally open contacts 377 of relay 77. In parallel with coil B of latching relay 77 is a pilot light 84 in a circuit 85 and a circuit 86 extends from circuit 71 to L1 and shunts about motor 40 and switch 41 and contains the hereinabove mentioned solenoid 30.

Extending from circuit 82 to L2 and shunting about contacts 81 of limit switch 64 is a circuit 87 in which are interposed the normally open contacts of push button 16 and in parallel with circuit 87 is a circuit 88 in which are interposed normally open contacts 89 which operate in conjunction with the apparatus 11 which is fed information by the device 10 with which the present invention is concerned. Also operating in conjunction with apparatus 11 are normally open contacts 90 interposed in circuit 78 and also disposed in the latter circuit are the normally open contacts of limit switch 69. Contacts 89, 90, as will later be disclosed, interlock operation of the device 10 of the present invention with operation of the apparatus 11 to which information is fed by device 10.

With the parts positioned as shown in FIGURES 4, 5, 6 and 11, operation will be as follows: A data card will be inserted in slot 15 until its leading end passes beyond the spaced rolls of roll set 25 and trips the actuator 32 of limit switch 31. The contacts of limit switch 31 will thereupon close causing current to flow through motor 40 via circuits 71, 73 and through solenoid 30 via circuits 86, 71 and 73. Current flow through solenoid 30 will move the upper roll of roll set 25 toward the lower roll to grip the data card therebetween (see FIGURE 8) and current flow through motor 40 via circuits 71, 73 will effect rotation of motor 40 in a direction to cause roll sets 24, 25 to feed the card to the right as viewed in FIGURE 4.

Motor 40 will continue to operate in the same direction until sprocket 38 has completed approximately one full turn. At this time, roll sets 24, 25 will have been rotated sufficiently to feed the card to its sensing position so long as it has been free to move along the guides 22, 23 under the driving impetus of the rotating roll sets.

Assuming for the moment that the data card has reached its sensing position preferably immediately before sprocket 38 has completed its one revolution and that the card has been stopped thereat by a suitable abutment, not shown, which engages the leading edge of the card, the card's leading edge will engage the actuator 70 of switch 69 and close its normally open contacts. With the closing of the contacts of switch 69 and assuming contacts 90 are closed at this time to indicate that apparatus 11 is ready to receive information from device 10, coil A of latching relay 77 will be energized to open contacts 177 and close contacts 277, 377. As sprocket 38 completes its revolution, pin 43 carried thereby will flip actuator 42 of toggle switch 41 and open the latter's contacts 141 and close its contacts 241. The opening of contacts 141 will break circuit 71 through motor 41; however, the closing of contacts 241 will not energize motor 40 through circuit 72 since the latter circuit is broken by the now open contacts 177. Accordingly, the motor 40 will come to rest.

With the closing of contacts 277 in circuit 83, motor 61 will be energized via circuits 82, 83, 72, 73 to rotate shaft 59 in the direction of the arrow from the position shown in FIGURE 6. When shaft 59 has rotated sufficiently to cause cams 60 to move arms 46, 47 from their uppermost position shown in FIGURE 6, the contacts of switch 76, whose actuator is engaged with arm 46, will open; however, current flow through motor 61 will continue uninterruptedly through circuit 82 because cam 63 previously closed the contacts of switch 65 after slight initial rotation of shaft 59. Motor 61 will continue to rotate until cams 60 have reached the position shown in FIGURE 9 wherein head 44 is in its lowermost position. At this time, cam 62 will actuate switch 64 to open its contacts 81 to thus interrupt current flow to motor 61 and close its contacts 80 to energize coil B of latching relay 77. With coil B energized, contacts 377 and 277 will open while contacts 177 will close. Note that all the circuits shown in FIGURE 11 will be open at this time with the exception of circuit 85 containing pilot light 84 which latter will remain lit to indicate that a card is in sensing position in the device.

Figure 9:
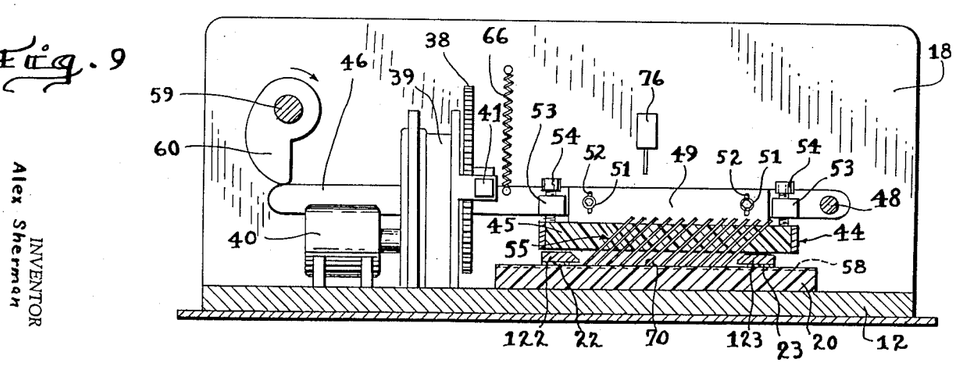
FIGURE 9 is a view similar to FIGURE 6 but showing certain parts in another position.

With head 44 in its lowermost position shown in FIGURE 9, each brush assembly will engage an underlying contact strip 58 and complete an electrical sensing circuit providing, of course, the card is perforated thereat. At the places where the card is not perforated, no such sensing circuit will be completed. Note that since head 44 swings about a pivot to card sensing position, the brush assemblies engage the contact strips with a wiping movement. Note also that the inclination of the brushes is such that they are inclined in the direction of wiping movement so that there will be no tendency for the brush ends to jab into either the contact strips or the data card surface with the attendant possibility of buckling them. A further advantage of inclining the brushes is that when so arranged, they will deflect as the head is moved to sensing position. Since the brushes themselves deflect, they need not be resiliently secured to the head but may be solidly affixed thereto, thus greatly reducing the complexity of parts.

As previously mentioned, apparatus 11 is designed to interpret the presence or absence of current flow through the various brush assemblies and to perform and/or to cause still other apparatus to perform various types of operations in accordance therewith. It should be pointed out that while the electrical connections to the brush assemblies and the contact strips have been omitted from the drawings in the interest of simplicity, each brush assembly and each contact strip will have an electrical lead connected thereto and such leads will extend to apparatus 11 to control operation of the latter in accordance with the presence or absence of current flow therethrough during the sensing operation. The manner in which apparatus 11 operates forms no part of the present invention; however, the apparatus will control contacts 89 which will close when such apparatus no longer requires the information on the data card.

With the closing of contacts 89, motor 61 will be energized through circuits 82, 88 since the contacts of limit switch 65 are closed at this time. Initial rotation of motor 61 will cause cam 62 to open contacts 80 and close contacts 81 of limit switch 64 to thereby keep motor 61 energized independently of contacts 89. When cams 60 have been rotated by motor 61 in the direction of the arrow sufficiently to allow springs 66 to return arms 46, 47 to their elevated positions shown in FIGURE 6, the contacts of limit switch 76 will close as a result of the return of arm 46 to its elevated position. The closing of the contacts of limit switch 76 will energize motor 40 via circuit 72 since contacts 241 of switch 41 are closed and contacts 141 of this switch are open. Energization of motor 41 through circuit 72 will cause it to rotate sprocket 38 in a direction to rotate roll sets 24, 25 in a direction to eject the data card. It will readily be apparent that since push button 16 is in parallel with contacts 89, operation of the push button will have the same effect as momentary closing of contacts 89.

When motor 61 has rotated sufficiently to return cams 60 to the position shown in FIGURE 6, cam 63 will cause the contacts of limit switch 65 to open to de-energize motor 61 and when motor 40 has rotated sufficiently to cause sprocket 38 to rotate substantially a full revolution, pin 43 thereof will engage actuator 42 of switch 41 and shift this actuator to open contacts 241 and close contacts 141. The opening of contacts 241 will not complete circuit 71 since actuator 32 of switch 31 has not been shifted by the data card in the proper direction (to the right as viewed in FIGURE 4) to close its contacts. Motor 40 will therefore come to rest with all of the various parts of the device in the positions shown in FIGURES 3, 4, 5, 6, 7 and 11. The card at this time will be projecting outwardly from slot 15 for ready removal.

It will readily be apparent that it is essential that the card be sensed only when it is properly orientated since improper orientation would completely change the rationality of the coded perforations; accordingly, the present device is adapted to reject a data card if it is improperly inserted in the entrance slot.

Assuming that the card has been improperly inserted into the slot 15, the card will be driven toward its sensing position as before described. However, abutment 67 (see FIGURE 3) will engage with one of the un-notched corners of the card and prevent its being shifted all the way to its sensing position to thereby trip limit switch 69. Since the improperly positioned card will be prevented from tripping switch 69, coil A of relay 77 will not be energized to open its contacts 177 and close its contacts 277, 377. Accordingly, when sprocket 38 has completed its revolution and has tripped switch 41, the latter will open its contact 141 and close its contacts 241. The closing of contacts 241 will permit current flow through circuits 72, 73 (since contacts 177 of relay 77 are closed at this time as are the contacts of limit switch 76) to thus immediately effect reverse operation of motor 40 to thereby immediately reject the data card.

The same result will occur, even though the card is properly orientated, in the event a card is inserted before apparatus 11 is ready to receive the information contained by the card. This is accomplished by contacts 99 disposed in series with switch 69 in circuit 78. Contacts 90 will be closed by apparatus 11 only when the latter is ready to receive the card information. It will be evident that so long as contacts 90 remain open, circuit 78 will not be completed and the data card will be rejected as above described if an attempt is made to insert it.

It is an important feature of the present invention that each brush assembly 55 is insulated from the others so that each may control a separate electrical sensing circuit. This permits the contact strips carried by plate 20 to be arranged in various ways in accordance with requirements. Obviously, however, the brush assemblies may be electrically connected together in any desired manner should this be required.

Figure 12:
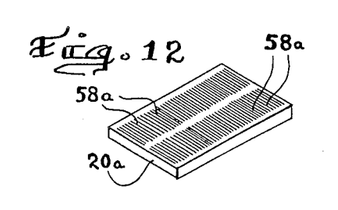

As previously mentioned and as shown in FIGURE 10, the embodiment thus far described has a plate 20 having contact strips 58 arranged in 80 rows and extending transversely of the data card. If desired, however, each contact strip may be divided into two separate strips 58a and 158a (see FIGURE 12) which are electrically insulated from each other. Such strips could also further be divided if desired.

Figure 13:
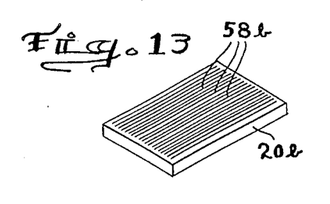

As seen in FIGURE 13, contact strips 58b extend longitudinally of the card and are at the present time arranged in 12 rows to correspond to the 12 longitudinal rows of card perforations. FIGURE 14 illustrates that each longitudinally extending contact strip may, if desired, be divided into two (or even more) individual strips 58c, 158c.

For certain operations, it is desirable that a card be sensed or read but one time only. This might result when, for example, inventory data cards are being sensed. Under such circumstances, it is desirable that means be provided to insure against sensing a card more than once.

Figure 15:
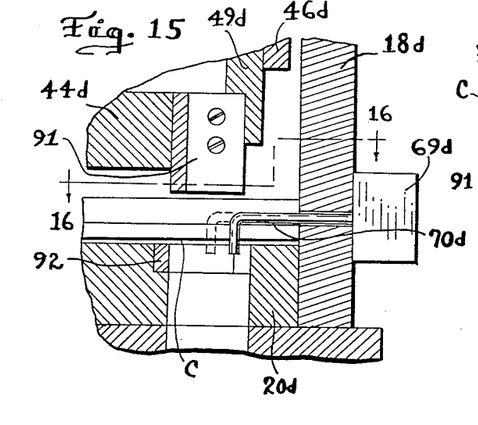
FIGURE 15 is an enlarged fragmentary view, similar to FIGURE 4, but of a modified construction.
Figure 16:
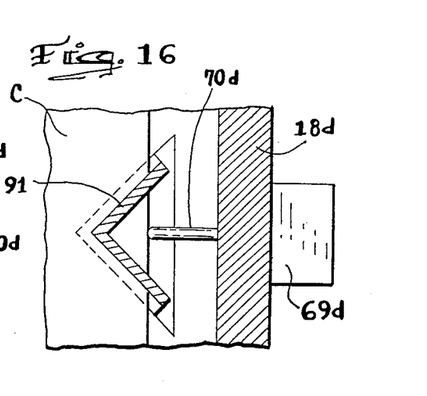
FIGURE 16 is a sectional view generally corresponding to the line 16—16 of FIGURE 15.

Referring to FIGURES 15 and 16, there is shown a modified construction which insures that a card will not be sensed more than one time. As illustrated, head 44d carries a V-shaped cutting knife 91 which cooperates with the cutting edge of a bed knife 92 carried by plate 20d to cut a notch from the leading edge of the data card C as head 44d moves down into sensing position. As best seen in FIGURE 16, actuator 70d of limit switch 69d is positioned between the two legs of the V-shaped cutting knife.

When a card is inserted in the device for sensing the first time, its leading edge will trip limit switch 69d as hereinbefore described; however, as the head 44d comes down to sensing position, it will remove a piece from the leading edge of the card adjacent switch actuator 70d. After the card has been ejected from the device, any attempt to re-insert it will result in its immediate ejection in the same manner as though it were inserted improperly orientated, as previously described, since the removal of the piece from the leading edge of the card prevents the latter from tripping switch 69d.

While not of frequent occurrence, it sometimes happens that one of the brush assemblies 55 becomes damaged. With the construction thus far disclosed, replacement of a damaged assembly would be somewhat time consuming since the damaged assembly would have to be pressed out of the plate 45 and a new one pressed into its place. Accordingly, it may be desirable to form the brush assemblies into groups, each of which is readily replaceable as a unit in the event one of its brushes becomes damaged.

Figures 17, 18:
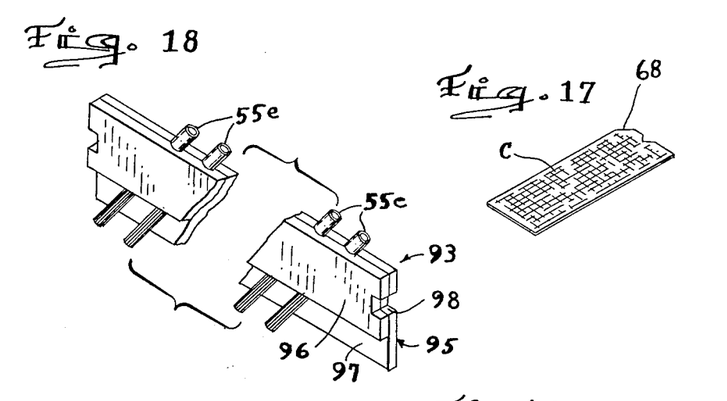
FIGURE 17 is a perspective view of a data card after being read by the embodiment seen in FIGURES 15 and 16.
FIGURE 18 is an enlarged, broken perspective view of a modified detail of construction.

As seen in FIGURE 18, each group of brushes is in the form of a strip 93 which carries a row of brush assemblies 55e corresponding in number and spacing to the apertures in the data card. Strips 93 will be disposed in side-by-side relation in a recess 94 formed in plate 45e (see FIGURES 19 and 20), and in the present embodiment, 80 strips are provided, one for each of the 80 rows of apertures in the data card.

Each brush assembly 55e may be similar to brush assemblies 55 and a plurality of brush assemblies will be arranged in a row and embedded in a suitable dielectric material to provide strip 93. In the present embodiment, each strip 93 comprises a pair of elongated plastic pieces 95, 96 suitably bonded together with the brush assemblies disposed therebetween. Either one or both of the pieces 95, 96 will be notched, before bonding each to the other, to receive respective brush assemblies and locate them at the desired angularity and at the proper spacing.

Figure 20:
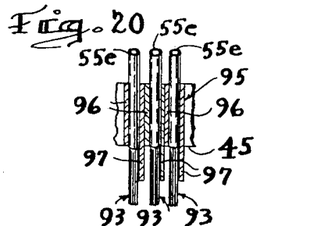
FIGURE 20 is an enlarged, fragmentary sectional view generally corresponding to the line 20—20 of FIGURE 19.

With reference to FIGURES 18 and 20, piece 95 is materially wider than is piece 96 to provide a wall 97 which separates the rows of brushes from each other when the strips 93 are disposed in side-by-side relation. As shown, the brushes project beyond the margin of wall 97 for ready engagement with the contact strips carried by the lower plate of the device as previously described.

Figure 19:
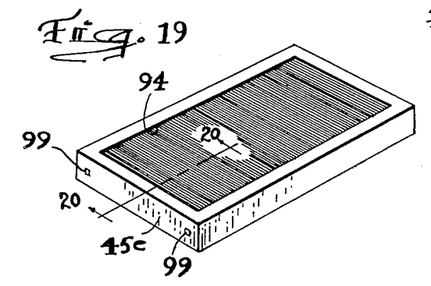
FIGURE 19 is a reduced size perspective view of an assembly which includes the detail shown in FIGURE 18.

Any suitable means may be employed to removably secure the strips 93 to plate 45e and in the present embodiment, the ends of strips 93 are notched at 98 to receive respective locking members 99 carried by plate 45e. It will be apparent that any of the strips 93 may readily be removed by first removing the locking members 99 and then raising the strip to be removed from its position. Replacement of the strip will be effected by reversing the operations aforesaid.

As previously pointed out, the embodiment thus far described provides for a very desirable wiping movement of the brush assemblies as the head moves to card sensing position. In the construction disclosed, however, this wiping movement reverses as the head is moved from card sensing position and thus there is the possibility that a brush assembly might conceivably be damaged during such movement. To completely eliminate any possibility of damaging the brush assemblies during movement of the head either toward or away from card sensing position, the construction shown in FIGURES 21 and 22 may be employed.

Figures 21, 22:
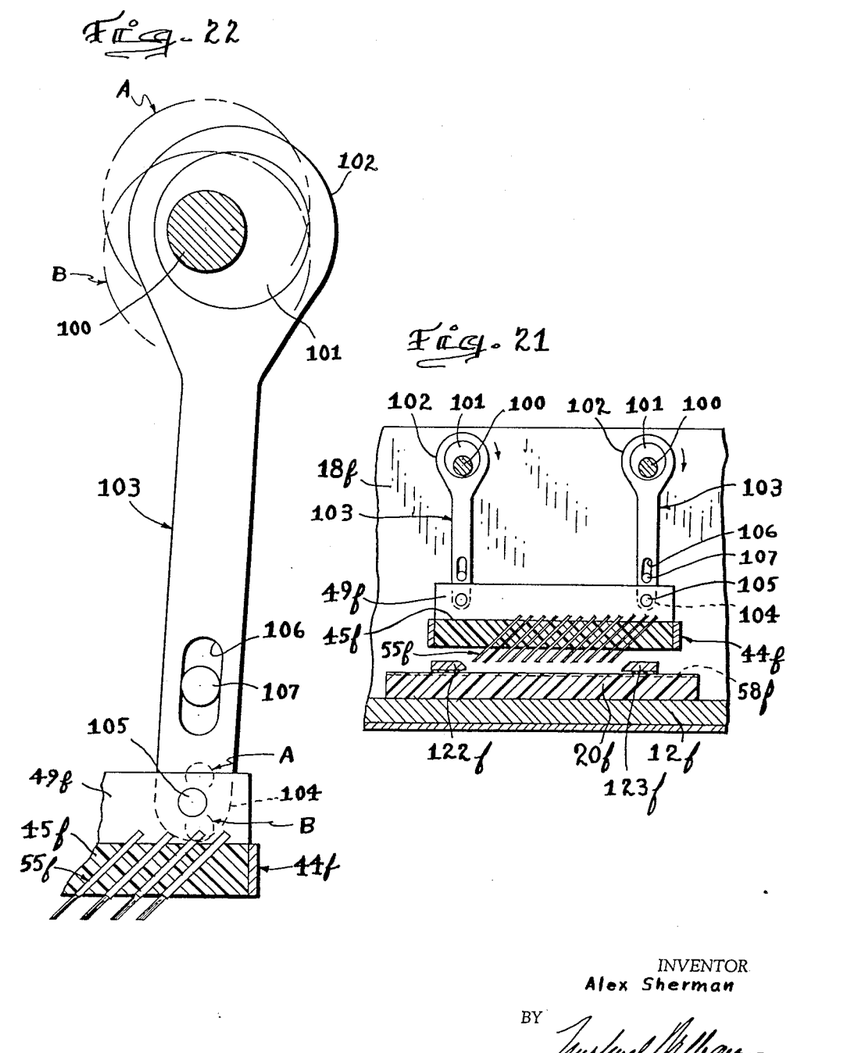
FIGURE 21 is a fragmentary view similar to FIGURE 6, but of another embodiment of the invention.
FIGURE 22 is an enlarged fragmentary view of a portion of the embodiment illustrated in FIGURE 21, but with certain parts shown in a different position.

Briefly, the construction shown in FIGURES 21 and 22 provides for wiping movement of the brush assemblies in the same direction at all times that the brush assemblies are engaged with either the data card or the underlying contact strips carried by the lower plate.

As seen in FIGURE 21, head 44f is supported by a pair of spaced shafts 100 which extend between and are rotatably supported by walls 17f, 18f. Although not shown, shafts 100 are suitably connected together for simultaneous rotation and they may be driven by means of a motor unit similar to that shown in FIGURE 3 and indicated by the reference character 61. Adjacent respective walls 17f, 18f (only the latter of which is shown in FIGURE 21), each shaft 100 carries an eccentric 101 on which is journaled an end 102 of respective links 103. Links 103 depend from respective eccentrics 101 and have their opposite ends 104 pivotally connected to head 44f by suitable pivots 105. With the construction thus far described, it is to be understood that head 44f is supported at its four corners by respective links 103. For a purpose to be seen, each link 103 is slotted at 106, adjacent its end 104, to receive a pin 107 which is anchored in a respective adjoining wall 17f, 18f.

In the position of parts shown in FIGURE 21, head 44f is in its uppermost position and to move the head down to card sensing position, shafts 100 will be rotated 180 degrees in the direction of the arrows. The eccentrics 101 will move links 103 down and thus move the head down until the brush assemblies carried thereby are in engagement with either the data card or with the underlying contact strips carried by plate 20f at the places where the data card is perforated.

FIGURE 22 best illustrates the operation of the embodiment seen in FIGURE 21 and in the full line position of parts shown, each shaft 100 has been rotated in the direction of the arrow 90 degrees from the initial position illustrated in FIGURE 21. This initial position is indicated by phantom lines labeled A. Note that in moving from the initial position to the full line position, head 44f has been moved down half way. Note also that end 102 of the link 103 has been shifted to the right; and since the link is pivotable about pin 107, the end 104 of the link together with the head has been shifted to the left. Since the brush assemblies are at this time still spaced above the data card, movement of the head to the left (and in the direction away from that in which the brush assemblies are inclined) will not tend to buckle the brush assemblies.

As shaft 100 continues to rotate in the direction of the arrow, it will shift the link 103 from the full line position to the phantom line position labeled B wherein head 44f will be moved to its lowermost position. Note that during this phase of movement, end 102 of the link will be shifted to the left while end 104 and head 44f will be shifted to the right and in the direction in which the brush assemblies carried thereby are inclined so that the brush assemblies will engage the data card and the underlying contact strips with a wiping movement. With head 44f in its lowermost position, the data card may be read, or sensed, as previously described.

When the data card is to be ejected from the device, shaft 100 will be rotated once again, still in the direction of the arrow, to return link 103 from position B to position A. Note that during the first 90 degrees of this movement of shaft 100, end 102 of the link will continue to be shifted to the left while end 104 and the head 44f will continue to be shifted to the right. At this same time, the link and the head will be raised half way to move the brush assemblies out of engagement with the data card and the contact strips. Rotation of shaft 100 the remaining 90 degrees will elevate the head to the position shown in FIGURE 21 and will move the head to the left; however, since the brush assemblies are at this time spaced above the data card, movement of the head to the left (and in the direction away from that in which the brush assemblies are inclined) will not tend to buckle the brush assemblies.

It is to be understood that while the amount of movement of head 44f to the right is rather slight, it is sufficient to insure that during vertical movement of the head, the bristles of the brush assemblies will at all times move in the direction of their inclination (from left to right) during the interim they are engaged with either the data card or the contact strips.

In view of the foregoing, it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. Apparatus for sensing the arrangement of perforations in a data card which is perforated in accordance with a prearranged code, comprising means for moving the card to and holding the card in a predetermined sensing position, a member aligned with but normally spaced from said predetermined card sensing position, means for moving said member and said card together when the latter is disposed in said alignment with said member and for moving them apart when the card so disposed is to be removed, a plurality of sensing means carried by said member and each controlling a respective electrical circuit in accordance with the presence or absence of a card perforation thereadjacent when said member and said card are moved together, and means responsive to the position of said card and preventing movement of said member and said card toward each other and for removing the card from the predetermined position in the event said card is improperly disposed in said position in misalignment with said member.

2. Apparatus for sensing the arrangement of perforations in a data card which is perforated in accordance with a prearranged code, comprising means for holding the card in a predetermined sensing position, a member aligned with but normally spaced from said predetermined card sensing position, and means providing an entrance slot in which a card to be sensed is adapted to be inserted, means for moving said card to said sensing position following its insertion into said slot, means for moving said member and said card together when the latter is disposed in said position in alignment with said member and for moving them apart when the card so disposed is to be removed, a plurality of sensing means carried by said member and each controlling a respective electrical circuit in accordance with the presence or absence of a card perforation thereadjacent when said member and said card are moved together, means responsive to the position of said card and preventing movement of said member and said card toward each other and for reversing the operation of the means for moving the card to the sensing position for causing said means to move the card from the sensing position through the entrance slot, in the event said card is improperly disposed in said position in misalignment with said member.

3. Apparatus for sensing the arrangement of perforations in a data card which is perforated in accordance with a prearranged code, comprising means for holding the card in a predetermined sensing position, a member aligned with but normally spaced from said predetermined card sensing position, means providing an entrance slot in which a card to be sensed is adapted to be inserted, means responsive to the entrance of said card into said slot for moving said card to said sensing position following its insertion into said slot, means for moving said member and said card together when the latter is disposed in said position in alignment with said member and for moving them apart when the card so disposed is to be removed, a plurality of sensing means carried by said member and each controlling a respective electrical circuit in accordance with the presence or absence of a card perforation thereadjacent when said member and said card are moved together, and means responsive to the position of said card and preventing movement of said member and said card toward each other and effecting immediate ejection of said card through said slot in the event said card is improperly positioned in said position.

4. Apparatus for sensing the arrangement of perforations in a data card which is perforated in accordance with a prearranged code, comprising a pair of members between which a card to be sensed is adapted to be disposed, one of said members being swingable about a pivot toward and away from the other and said one member normally being spaced from said other to provide for unimpeded movement of said card therebetween, means providing an entrance slot in which a card to be sensed is adapted to be inserted, means responsive to the entrance of said card into said slot for moving said card between said members for sensing, means for moving said one member about its pivot toward said other member upon disposition of a card therebetween, a plurality of sensing means carried by respective members and cooperable to control respective electrical sensing circuits in accordance with the presence or absence of a card perforation thereadjacent when said members are moved together, and means responsive to the position of said card and preventing movement of said one member toward the other and effecting immediate ejection of said card through said slot in the event said card is improperly positioned for sensing between said members.

5. Apparatus for sensing the arrangement of perforations in a data card which is perforated in accordance with a prearranged code, comprising means for holding the card in a predetermined sensing position, a member aligned with but normally spaced from said predetermined card sensing position, means providing an entrance slot in which said card is adapted to be inserted, rotatably mounted roller means adjacent to but spaced from the slot mouth and normally biased away from engagement with the card to provide for ready entrance of the latter therebetween, means responsive to the entrance of said card into said slot beyond said roller means for moving the latter into engagement with said card and for effecting rotation thereof in a direction to move said card between said members for sensing, means for moving said member and said card together when the latter is disposed in said position in alignment with said member, and a plurality of sensing means carried by said member and each controlling a respective electrical sensing circuit in accordance with the presence or absence of a card perforation thereadjacent when said member and said card are moved together.

6. Apparatus for sensing the arrangement of perforations in a data card which is perforated in accordance with a prearranged code, comprising a pair of normally spaced-apart members between which the card to be sensed is adapted to be disposed, means providing an entrance slot in which said card is adapted to be inserted, rotatably mounted roller means engageable with said card and disposed adjacent the slot mouth, means for effecting rotation of said roller means a predetermined amount first in one direction to move said card between said members to sensing position and then in the opposite direction to move said card from between said members for ejection from said slot, means responsive to the entrance of said card into said slot for effecting rotation of said roller means in said one direction, means responsive to the position of said card providing for immediate rotation of said roller means in said opposite direction to eject said card upon completion of roller means rotation in said one direction in the event said card is improperly positioned for sensing between said members and for postponing rotation of said roller means in said other direction and for effecting movement of said members together when said card is properly disposed for sensing between said members, and a plurality of sensing means carried by said members and cooperable to control electrical sensing circuits in accordance with the presence or absence of a card perforation thereadjacent when said members are moved together.

7. Apparatus for sensing the arrangement of perforations in a data card which is perforated in accordance with a prearranged code, comprising a pair of members between which a card to be sensed is adapted to be disposed, one of said members being swingable about a pivot toward and away from the other and said one member normally being spaced from said other to provide for unimpeded movement of said card therebetween, means providing an entrance slot in which said card is adapted to be inserted, rotatably mounted roller means engageable with said card and disposed adjacent the mouth of said slot intermediate the latter and said members, means for effecting rotation of said roller means a predetermined amount first in one direction to move said card between said members to sensing position and then in the opposite direction to move said card from between said members for ejection from said slot, means for moving said one member about its pivot toward said other member upon disposition of said card therebetween, means responsive to the entrance of said card into said slot for effecting rotation of said roller means in said one direction, means responsive to the position of said card and providing for immediate rotation of said roller means in said opposite direction to eject said card upon completion of roller means rotation in said one direction in the event said card is improperly positioned for sensing between said members and for postponing rotation of said roller means in said other direction and for effecting movement of said one member toward the other when said card is properly disposed for sensing between said members, and a plurality of sensing means carried by said members and cooperable to control electrical sensing circuits in accordance with the presence or absence of a card perforation thereadjacent when said members are moved together.

8. Apparatus for sensing the arrangement of perforations in a data card which is perforated in accordance with a prearranged code, comprising means defining a path for guiding a card to be sensed to a predetermined sensing position and having an entrance mouth in which said card is adapted to be inserted, means providing electrical contact means adjacent one face of said card at its sensing position, a member swingable about a pivot toward and away from said contact means and normally being spaced therefrom to provide for unimpeded movement of said card therebetween, a plurality of electrical contact fingers carried by said member and cooperable with said contact means to control electrical sensing circuits in accordance with the presence or absence of a card perforation thereadjacent when said member is moved toward said contact means, rotatably mounted roller means engageable with said card and disposed adjacent said entrance mouth intermediate the latter and the sensing position of said card, means for effecting rotation of said roller means a predetermined amount first in one direction to move said card along said path to said sensing position and then in the opposite direction to move said card from said sensing position along said path in the opposite direction to eject said card through said mouth, means for moving said member about its pivot toward said contact means upon disposition of said card at said predetermined sensing position, means responsive to the entrance of said card into said mouth for effecting rotation of said roller means in said one direction, and means responsive to the position of said card and providing for immediate rotation of said roller means in said opposite direction to eject said card upon completion of roller means rotation in said one direction in the event said card is improperly positioned for sensing and for postponing rotation of said roller means in said other direction and for effecting movement of said member about its pivot toward said contact means to provide for engagement of said contact fingers therewith in accordance with the perforations in said card when the latter is properly disposed in said predetermined sensing position.

9. Apparatus for sensing the arrangement of perforations in a data card which is perforated in accordance with a prearranged code, comprising a plurality of sensing means each controlling an electrical sensing circuit in accordance with the presense or absence of a card perforation thereadjacent when said card is disposed in sensing position, means for moving the card to the sensing position, means for marking a card when the card is in the sensing position to indicate that it has been subjected to a sensing operation by said apparatus, means for moving the card from the sensing position, and means responsive to a marked card when the card is in the sensing position to prevent sensing thereof by said apparatus a second time and for actuating the means for moving the card from the sensing position.

10. Apparatus for sensing the arrangement of perforations in a data card which is perforated in accordance with a prearranged code, comprising a plurality of sensing means each controlling an electrical sensing circuit in accordance with the presence or absence of a card perforation thereadjacent when said card is disposed in sensing position, means for removing a card portion to indicate that it has been subjected to a sensing operation by said apparatus, and means responsive to the space from which said card portion was removed to prevent sensing of such card a second time and for ejecting the card from the apparatus.

11. Apparatus for sensing the arrangement of perforations in a data card which is perforated in accordance with a prearranged code, comprising means providing a surface adjacent one face of the card when the latter is disposed in a predetermined sensing position, a plurality of electrical contact means embedded in and substantially flush with said surface, a member normally disposed in a first position spaced from said surface and shiftable therefrom to a second position adjacent said surface, and a plurality of resilient, current conductive, brushes carried by said member and inclined in a predetermined direction for engagement with said contact means at an acute angle to control electrical sensing circuits in accordance with the presence or absence of a card perforation thereadjacent when said member is in said second position and the card to be sensed is in the predetermined sensing position, said brushes being spaced from said contact means when said member is in said first position to provide for uninterrupted movement of said card therebetween and means including an eccentric crank for moving said member from said first position to said second position upon disposition of said card at said predetermined sensing position and, said means for moving said member being arranged for simultaneously shifting said member in the direction of inclination of said brushes as the latter engage and disengage said card and said contact means to insure against buckling of said brushes.

12. Apparatus for sensing the arrangement of perforations in a data card which is perforated in accordance with a prearranged code, comprising means providing a surface adjacent one face of the card when the latter is disposed in a predetermined sensing position, a plurality of electrical contact means embedded in and substantially flush with said surface, a member normally disposed in a first position spaced from said surface and shiftable therefrom to a second position adjacent said surface, and a plurality of resilient, current conductive brushes carried by said member and inclined in a predetermined direction for engagement with said contact means at an acute angle to control electrical sensing circuits in accordance with the presence or absence of a card perforation thereadjacent when said member is in said second position and the card to be sensed is in the predetermined sensing position, said brushes being spaced from said contact means when said member is in said first position to provide for uninterrupted movement of said card therebetween and means for moving said member from said first position to said second when a card to be sensed is disposed in said predetermined sensing position and for moving said member from said second position to said first when said card is to be removed from said predetermined sensing position, said means for moving said member including an eccentric crank for simultaneously shifting the member in the direction of inclination of said brushes during its movement both toward and away from said contact means to insure against buckling said brushes.

13. Apparatus for sensing the arrangement of perforations in a data card which is perforated in accordance with a prearranged code, comprising means providing a surface adjacent one face of the card when the latter is disposed in a predetermined sensing position, a plurality of electrical contact means embedded in and substantially flush with said surface, a member normally disposed in a first position spaced from said surface and shiftable therefrom to a second position adjacent said surface, and a plurality of resilient, current conductive brushes carried by said member and inclined in a predetermined direction for engagement with said contact means at an acute angle to control electrical sensing circuits in accordance with the presence or absence of a card perforation when said member is in said second position and a card is in the predetermined sensing position, said brushes being spaced from said contact means when said member is in said first position to provide for uninterrupted movement of said card therebetween and means including an eccentric crank for moving said member from said first position to said second when a card to be sensed is disposed in said predetermined sensing position and for moving said member from said second position to said first when said card is to be removed from said predetermined sensing position, said eccentric crank being arranged for moving member simultaneously in the direction of inclination of said brushes during both the latter stages of its movement toward said contact means and the initial stages of its movement away therefrom to insure against buckling said brushes.

14. Apparatus for sensing the arrangement of perforations in a data card which is perforated in accordance with a prearranged code, comprising means providing a surface adjacent one face of the card when the latter is disposed in a predetermined sensing position, a plurality of electrical contact means embedded in and substantially flush with said surface, a member normally disposed in a first position spaced from said surface and shiftable therefrom to a second position adjacent said surface, a plurality of resilient, current conductive brushes carried by said member and inclined in a predetermined direction for engagement with said contact means at an acute angle to control electrical sensing circuits in accordance with the presence or absence of a card perforation there-adjacent when said member is in said second position and the card is disposed in the predetermined sensing position, said brushes being spaced from said contact means when said member is in said first position to provide for uninterrupted movement of said card therebetween, and means for moving said member from said first position to said second position when a card to be sensed is disposed in said predetermined sensing position and for moving said member from said second position to said first position when said card is to be removed from said predetermined sensing position, said last named means also including means for simultaneously shifting said member in the direction of inclination of said brushes during both the latter stages of its movement toward said contact means and the initial stages of its movement away therefrom to insure against buckling said brushes.

References Cited in the file of this patent
UNITED STATES PATENTS

| | | |
|---|---|---|
| 1,991,729 | Brougham | Feb. 19, 1935 |
| 2,514,031 | Daly | July 4, 1950 |
| 2,591,448 | Lorenz | Apr. 1, 1952 |
| 2,890,828 | Stark et al. | June 16, 1959 |